United States Patent
Li et al.

(10) Patent No.: US 9,848,155 B2
(45) Date of Patent: Dec. 19, 2017

(54) TV PROGRAM PLAYING METHOD, REMOTE CONTROL AND TV

(71) Applicant: BOE TECHNOLOGY GROUP CO., LTD., Beijing (CN)

(72) Inventors: Yanfu Li, Beijing (CN); Katsuhiro Masuyama, Beijing (CN); Zhigang Zhou, Beijing (CN); Hui Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 4 days.

(21) Appl. No.: 15/151,874

(22) Filed: May 11, 2016

(65) Prior Publication Data

US 2017/0054933 A1   Feb. 23, 2017

(30) Foreign Application Priority Data

Aug. 18, 2015 (CN) .......................... 2015 1 0508114

(51) Int. Cl.
  H04N 5/44 (2011.01)
  H04N 21/422 (2011.01)
  H04N 21/475 (2011.01)

(52) U.S. Cl.
  CPC ..... *H04N 5/4403* (2013.01); *H04N 21/42201* (2013.01); *H04N 21/42222* (2013.01);
  (Continued)

(58) Field of Classification Search
  USPC ....... 348/734, 735, 706, 714, 725, 756, 779, 348/781, 658, 684, 816, 832, 333.13,
  (Continued)

(56) References Cited

U.S. PATENT DOCUMENTS 6,241,684 B1 * 6/2001 Amano .............. A61B 5/02438
  600/503
7,367,950 B1 * 5/2008 Masakov ................. A61B 5/00
  128/920

(Continued)

FOREIGN PATENT DOCUMENTS

CN    20146732 U    5/2010
CN    103297846 A   9/2013

(Continued)

OTHER PUBLICATIONS

First Office Action regarding Chinese Application No. 201510508114.1, dated Oct. 9, 2017. Translation provided by Dragon Intellectual Property Law Firm.

*Primary Examiner* — Jefferey F Harold
*Assistant Examiner* — Mustafizur Rahman
(74) *Attorney, Agent, or Firm* — Harness, Dickey & Pierce, P.L.C.

(57) ABSTRACT

The present disclosure provides a TV program playing method, a remote control and a TV, and the method comprises: obtaining, by the remote control, a first unlock instruction triggered by a first user when a TV system is in standby state; obtaining, by the remote control, a first heart rate feature information of the first user via the optical sensor according to the first unlock instruction; sending, by the remote control, a first playing instruction carrying an identifier of the first user to the TV when a difference between the first heart rate feature information and a second heart rate feature information in a feature library is less than a threshold so that the TV plays a program in a program list corresponding to the identifier of the first user, wherein the feature library pre-stores corresponding relationship between identifiers and heart rate feature information of users.

12 Claims, 6 Drawing Sheets

(52) U.S. Cl.
CPC ... *H04N 21/4753* (2013.01); *H04N 2005/441* (2013.01); *H04N 2005/4412* (2013.01); *H04N 2005/4428* (2013.01); *H04N 2005/4442* (2013.01); *H04N 2005/4444* (2013.01)

(58) Field of Classification Search
USPC ..... 348/333.09, 341, 351, 211.6, 238, 240.1, 348/290, 211.99, 119, 114, 98, 54, 14.11, 348/14.05, 14.03; 340/4.3, 393.3, 426.13, 340/426.17, 426.35, 815.6, 815.48, 340/815.57; 600/28, 134, 483, 485, 508, 600/511, 513, 527, 528
See application file for complete search history.

(56) References Cited

U.S. PATENT DOCUMENTS

| | | | |
|---|---|---|---|
| 7,398,151 B1* | 7/2008 | Burrell | A63B 24/0062 342/357.75 |
| 2007/0070188 A1* | 3/2007 | Shyu | H04N 7/147 348/14.11 |
| 2008/0258917 A1* | 10/2008 | Boyd | A63B 24/0062 340/572.1 |
| 2009/0210922 A1* | 8/2009 | White | H04N 7/17318 725/151 |
| 2011/0202981 A1* | 8/2011 | Tamai | G06F 21/10 726/6 |
| 2011/0242269 A1* | 10/2011 | Nothlings | H04N 5/45 348/14.05 |
| 2011/0310796 A1* | 12/2011 | Um | H04N 7/141 370/328 |
| 2012/0035950 A1* | 2/2012 | Tich | A61B 5/222 705/2 |
| 2012/0226117 A1* | 9/2012 | Lamego | A61B 5/14532 600/316 |
| 2013/0131520 A1* | 5/2013 | Tsubata | A61B 5/0015 600/483 |
| 2013/0146659 A1* | 6/2013 | Zhou | G06Q 20/355 235/380 |
| 2013/0154838 A1* | 6/2013 | Alameh | G04G 21/02 340/575 |
| 2013/0229582 A1 | 9/2013 | Du et al. | |
| 2014/0118118 A1* | 5/2014 | Hanssen | G08C 17/00 340/12.5 |
| 2014/0266787 A1* | 9/2014 | Tran | A61B 5/0022 340/870.07 |
| 2014/0316305 A1* | 10/2014 | Venkatraman | A61B 5/1112 600/595 |
| 2014/0358012 A1* | 12/2014 | Richards | A61B 5/02438 600/479 |
| 2015/0081673 A1* | 3/2015 | Kaneko | G06F 17/30029 707/722 |

FOREIGN PATENT DOCUMENTS

| | | |
|---|---|---|
| CN | 103581722 A | 2/2014 |
| CN | 203825800 U | 9/2014 |
| EP | 1892961 A1 | 2/2008 |

\* cited by examiner

TV PROGRAM PLAYING METHOD, REMOTE CONTROL AND TV

CROSS-REFERENCE TO RELATED APPLICATION

The present application claims a priority of the Chinese patent application No. 201510508114.1 filed on Aug. 18, 2015, where the entire contents by reference are incorporated herein.

TECHNICAL FIELD

The present disclosure relates to remote control technology, and more particularly, to a TV program playing method, a remote control and a television (TV).

BACKGROUND

Along with the progress of science and technology and the improvement of people's living standard, TV has become an indispensable entertainment facility in people's lives, and furthermore remote control makes it convenient so control the TV within a certain distance by a viewer.

At the same time, with the continuous improvement of the functions of TV and the increasing number of TV programs, different types of TV programs may be applicable to different viewers, for example, some TV programs are full of sex and violence factors and may have negative impact on minors; therefore, how to provide the corresponding TV programs for different users becomes an urgent problem to be solved.

SUMMARY

The objective of disclosed embodiments is to provide a TV program playing method, a remote control and a TV so as to provide corresponding TV programs for different users.

To realize the aforementioned objective, the disclosed embodiments adopt the following technical solutions.

In one aspect, the present disclosure provides a TV program playing method applied to a remote control which is provided with an optical sensor, the method includes: obtaining, by the remote control, a first unlock instruction triggered by a first user when a TV system is in standby state; obtaining, by the remote control, a first heart rate feature information of the first user via the optical sensor according to the first unlock instruction; sending, by the remote control, a first playing instruction carrying an identifier of the first user to the TV when a difference between the first heart rate feature information and a second heart rate feature information in a feature library is less than a threshold, so that the TV plays a program in a program list corresponding to the identifier of the first user, wherein the feature library pre-stores corresponding relationship between identifiers and heart rate feature information of users.

Furthermore, after the remote control obtains the first heart rate feature information of the first user via the optical sensor according to the first unlock instruction, the method further includes: displaying, by the remote control, the first heart rate feature information of the first user.

Furthermore, the step of sending, by the remote control, the first playing instruction to the TV when a difference between the first heart rate feature information and the second heart rate feature information in the feature library is less than the threshold, includes: lighting, by the remote control, an indicator light of a first key corresponding to the first user; sending, by the remote control, the first playing instruction to the TV when the first user triggers the first key.

Furthermore, after obtaining, by the remote control, the first heart rate feature information of the first user via the optical sensor according to the first unlock instruction, the method further includes: authenticating, by the remote control, the first user when the differences between the first heart rate feature information and each of the pre-stored heart rate feature information in the feature library are all larger than the threshold; obtaining, by the remote control, the heart rate feature information of the first user via the optical sensor, and storing the heart rate feature information of the first user and the identifier of the first user in the feature library when the first user is authenticated.

Furthermore, after the remote control sends the first playing instruction to the TV when the difference between the first heart rate feature information and the second heart rate feature information in the feature library is less than the threshold, the method further includes: obtaining, by the remote control, a third heart rate feature information of the second user via the optical sensor when a second unlock instruction triggered by a second user is obtained; comparing, by the remote control, the priority of the second user and that of the first user when the difference between the third heart rate feature information and a fourth heart rate feature information in the feature library is less than the threshold; sending, by the remote control, a second playing instruction carrying an identifier of the second user to the TV when the priority of the second user is higher than that of the first user, so that the TV plays a program in a program list corresponding to the identifier of the second user.

Furthermore, the first heart rate feature information of the first user is an average value of the heart rate of the first user measured in a certain period of time or a heart rate chart in a certain period of time of the first user.

Furthermore, the remote control pre-stores the priority order among all users.

In another aspect, the disclosure provides a TV program playing method, including steps of: receiving, by a TV, a first playing instruction carrying an identifier of a first user sent by a remote control; searching, by the TV, a program list pre-stored in a program library and corresponding the identifier of the first user, wherein the program library pre-stores corresponding relationship between identifiers of users and program lists; playing, by the TV, a program in the program list corresponding to the identifier of the first user.

In yet another aspect, the disclosure provides a remote control, including an optical sensor, wherein the remote control further includes: an obtaining unit, configured to obtain a first unlock instruction triggered by a first user when a TV system is in standby state; a collecting unit, configured to obtain a first heart rate feature information of the first user via the optical sensor according to the first unlock instruction; an instruction sending unit configured to send a first playing instruction carrying an identifier of the first user to the TV when the difference between the first heart rate feature information and a second heart rate feature information in a feature library is less than a threshold, so that the TV plays a program in a program list corresponding to the identifier of the first user; a storing unit configured to store the feature library, the feature library pre-storing corresponding relationship between identifiers of users and heart rate feature information.

Furthermore, the remote control further includes a displaying unit configured to displays the first heart rate feature information of the first user.

Furthermore, the displaying unit is further configured to lighten an indicator light of a first key corresponding to the first user when the difference between the first heart rate feature information and the second heart rate feature information pre-stored in the feature library is less than the threshold; and the instruction sending unit is further configured to send the first playing instruction to the TV when the first user triggers the first key.

Furthermore, the remote control further includes an authenticating unit configured to authenticate the first user when the differences between the first heart rate feature information and each of the pre-stored heart rate feature information in the feature library are all larger than the threshold, wherein the collecting unit is further configured to obtain the heart rate feature information of the first user via the optical sensor and store the heart rate feature information of the first user and the identifier of the first user in the feature library when the first user is authenticated.

Furthermore, the remote control further includes a comparing unit, wherein, the collecting unit is further configured to obtain a third heart rate feature information of a second user via the optical sensor when a second unlock instruction triggered by the second user is obtained; the comparing unit is configured to compare the priority of the second user and that of the first user when the difference between the third heart rate feature information and a fourth heart rate feature information in the feature library is less than the threshold; the instruction sending unit is further configured to send a second playing instruction carrying an identifier of the second user to the TV when the priority of the second user is higher than that of the first user, so that the TV plays a program in a program list corresponding to the identifier of the second user.

In yet another aspect, the disclosure provides a TV, including: an instruction receiving unit configured to receive a first playing instruction sent by a remote control, wherein the first playing instruction carries an identifier of a first user; an searching unit configured to search a program list corresponding to the identifier of the first user and pre-stored in a program library, wherein the program library pre-stores corresponding relationship between identifiers of users and program lists; a playing unit configured to play a program in the program list corresponding to the identifier of the first user.

The embodiments of the present disclosure provide a TV program playing method applied to a remote control which is provided with an optical sensor. When a TV system is in standby state, the remote control obtains a first unlock instruction triggered by a first user. The remote control further obtains a first heart rate feature information of the first user via the optical sensor according to the first unlock instruction. Since the feather library pre-stores corresponding relationship between identifiers of multiple users and their hear rate feature information, if the difference between the first heart rate feature information and a second heart rate feature information in a feature library is less than a threshold, matching is succeed, the remote control sends a first playing instruction to the TV, where the first playing instruction carries an identifier of the first user, so that the TV plays a program in a program list corresponding to the identifier of the first user.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In the below description, the specific details of the special system structure, interface and technique are used for illustration instead of limitation, so that the present disclosure may be better understood. However, a person skilled in the art shall understand that the present disclosure maybe implemented in other embodiments without such specific details. In other conditions, the well known device, circuit or method may be omitted so that unnecessary details won't hinder the description of the present disclosure.

Unless otherwise defined, any technical or scientific term used herein shall have the common meaning understood by a person of ordinary skills. Such words as "first", "second" and the like used in the specification and claims are merely used to differentiate different components rather than to represent any order, number or importance. Therefore, the features defined by "first", "second" and the like may include one or more such features. In the present disclosure, unless otherwise defined, multiple or a plurality indicates two or more.

Figure 1:
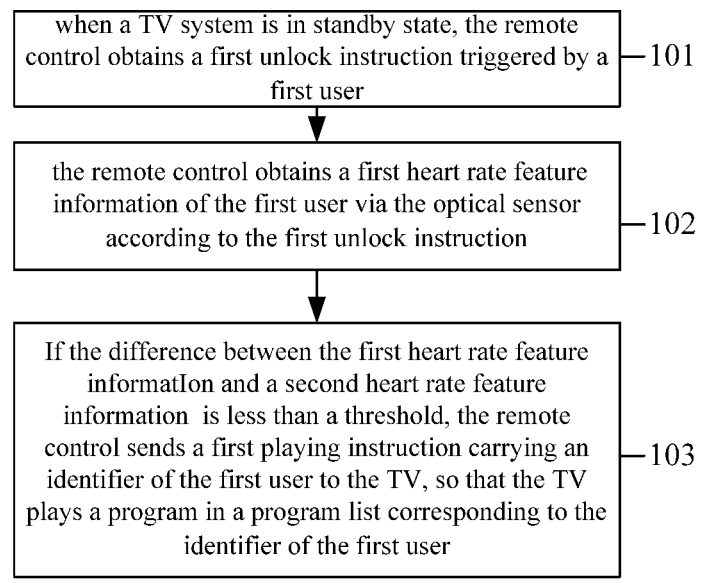
FIG. 1 is a schematic flow chart showing a remote control unlock method according to at least one embodiment of the present disclosure.

One embodiment of the present disclosure provides a remote control unlock method applied to a remote control which is provided with an optical sensor. As shown in FIG. 1, the method includes the following steps.

Step 101, when a TV system is in standby state, the remote control obtains a first unlock instruction triggered by a first user.

Step 102, the remote control obtains a first heart rate feature information of the first user via the optical sensor according to the first unlock instruction.

Step 103, if the difference between the first heart rate feature information and a second heart rate feature information in a feature library is less than a threshold, the remote control sends a first playing instruction to the TV, where the first playing instruction carries an identifier of the first user, so that the TV plays a program in a program list corresponding to the identifier of the first user.

In order to provide different TV programs to different viewers, when the TV system is in a standby mode, the remote control is in a locked status. When the remote control is unlocked, the corresponding TV programs may be provided to the users who unlock the remote control.

Specifically, in Step 101, when a TV system is in standby state, the remote control detects a first unlock action triggered by the first user, and generates the first unlock instruction based on the first unlock action, so that the remote control obtains the first heart rate feature information of the first user based on the first unlock instruction.

The remote control may be a key style remote control or a touch style remote control. For any style remote control, a sensing region may be provided. When any user triggers a first unlock action at the sensing region, the first unlock instruction is generated. For example, the first unlock action may be putting any finger on the sensing region. For illustration, when any user puts his thumb on a heat rate detection region provided with the optical sensor, the remote control generates the first unlock instruction according to the first unlock action. The first unlock instruction is used to indicate to obtaining the first heart rate feature information of the first user.

Furthermore, the TV system may be a individual TV set, or includes a TV set and a set top box connected to the TV set. Those will not be limited herein.

In Step 102, the remote control obtains a first heart rate feature information of the first user via the optical sensor embedded in the remote control according to the first unlock instruction obtained in Step 101.

The optical sensor may obtain the number of heart beating per minute by detecting the flow speed of blood when an LED light illuminates blood capillary under skin.

Specifically, since the blood is red, it will reflect a red light and absorb a green light. When the heart is beating, flux of blood increases, the amount of the green light absorbed by blood will increases accordingly. Flux of blood decreases during the intervals of heart beating, the amount of the green light absorbed by blood will decrease accordingly. The optical sensor embedded in the remote control may detect heart rate based on the Absorbance of blood so as to obtain the first heart rate feature information of the first user.

The first hear rate feature information maybe an average value of heart rate of the first user measured during a certain time period, or a heart rate chart measured during a certain time period and so on. Those will be not limited herein.

Furthermore, the remote control stores a feature library which pre-stores the corresponding relationship between each user and his heart rate feature information. As shown in Table 1, the optical sensor embedded in the remote control may pre-collect heart rate feature information of each user (for example, family members), and the remote control builds the corresponding relationship between each user and his heart rate feature information.

TABLE 1

| User | Heart rate feature information |
| --- | --- |
| First user | Second heart rate feature information (for example an average number of heart rate) |
| Second user | Fourth heart rate feature information (for example, sinus arrhythmia) |
| . . . | . . . |

In Step 103, as shown in Table 1, if the difference between the first heart rate feature information obtained in Step 102 and the second heart rate feature information in the feature library is less than a threshold, for example, the first heart rate feature information is 60/min and the second heart rate feature information is 65/min, and the threshold is 8, it is determined that the difference is smaller than the threshold, that is it is determined the user to trigger the first unlock action is the first user. At this time, the remote control sends a first playing instruction to the TV, where the first playing instruction carries an identifier of the first user, so that the TV calls out a program list corresponding to the identifier of the first user and play TV programs in the program list, or play TV programs selected by the first user in the program list.

Specifically, heart rate of an infant may reach 120-140/min, heart rate of a baby at an age up to one year old may be 110-130/min, heart rate of a child at an age of 2-3 years old may be 100-120/min, heart rate of a child at an age of 4-7 years old may be 80-100/min, and heart rate of an adult is about 60-80/min. Since heats rates of a child and an adult have significant difference, corresponding TV programs may be provided to a child or an adult properly based on the above remote control unlock method. The adverse influence of the TV programs with sex and violence factors on a child may be avoided.

Certainly, the TV set may pre-stores identifiers of multiple users (including the first user) and TV programs corresponding to the identifiers, for example, the TV programs corresponding to user A (a six years old child) are children's programs and music programs. The program list for each user maybe updated according to update of programs at each TV station, or each user manually updates the program list of the user.

The embodiments of the present disclosure provide a TV program playing method applied to a remote control which is provided with an optical sensor. When a TV system is in standby state, the remote control obtains a first unlock instruction triggered by a first user. The remote control further obtains a first heart rate feature information of the first user via the optical sensor according to the first unlock instruction. Since the feather library pre-stores corresponding relationship between identifiers of multiple users and their hear rate feature information, if the difference between the first heart rate feature information and a second heart rate feature information in a feature library is less than a threshold, matching is succeed, the remote control sends a first playing instruction to the TV, where the first playing instruction carries an identifier of the first user, so that the TV plays a program in a program list corresponding to the identifier of the first user. Therefore, the remote control may recognize the heart rate feature information of different users and provide corresponding programs to the users.

Figure 2:
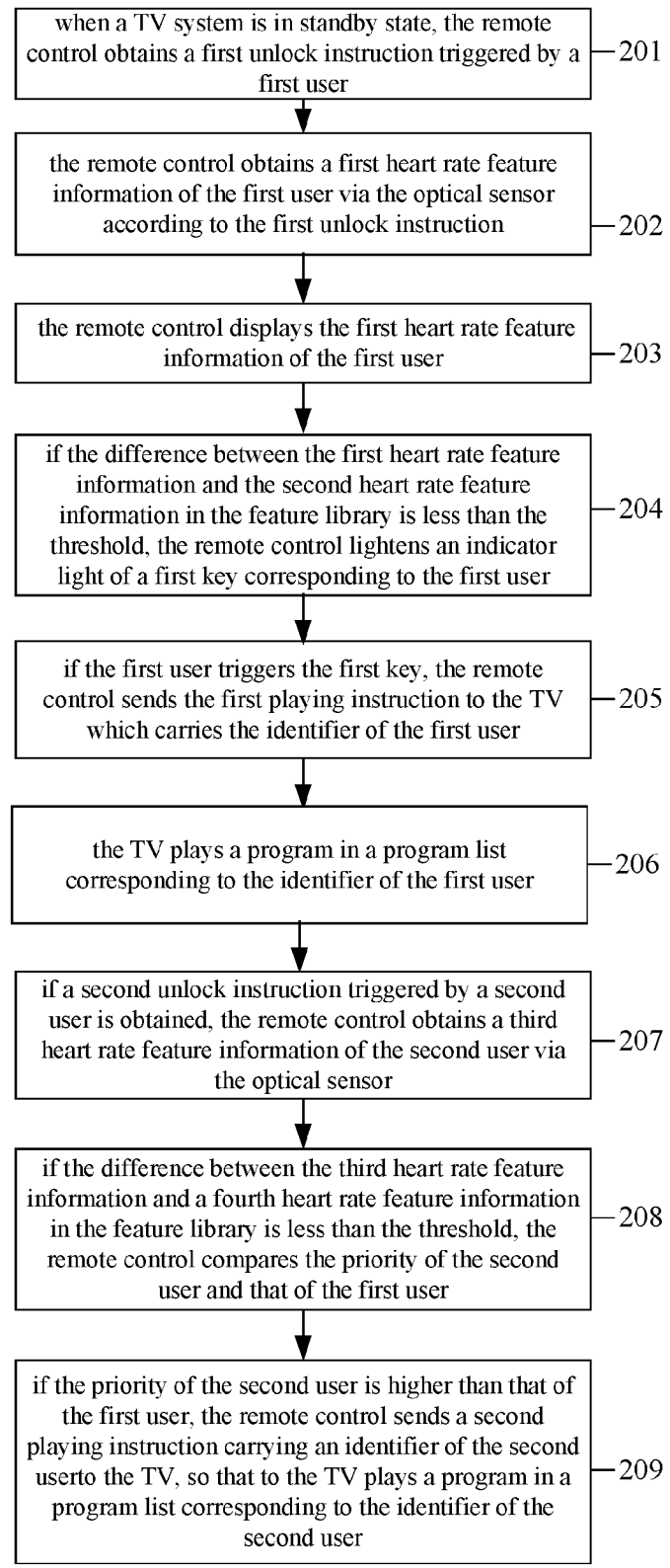
FIG. 2 is another schematic flow chart showing a remote control unlock method according to at least one embodiment of the present disclosure.

One embodiment of the present disclosure provides a remote control unlock method applied to a remote control which is provided with an optical sensor. As shown in FIG. 2, the method includes the following steps.

Step 201, when a TV system is in standby state, the remote control obtains a first unlock instruction triggered by a first user.

Step 202, the remote control obtains a first heart rate feature information of the first user via the optical sensor according to the first unlock instruction.

Step 203, the remote control displays the first heart rate feature information of the first user.

Step 204, if the difference between the first heart rate feature information and the second heart rate feature information in the feature library is less than the threshold, the remote control lightens an indicator light of a first key corresponding to the first user.

Step 205, if the first user triggers the first key, the remote control sends the first playing instruction to the TV which carries the identifier of the first user.

Step 206, the TV plays a program in a program list corresponding to the identifier of the first user.

Step 207, if a second unlock instruction triggered by a second user is obtained, the remote control obtains a third heart rate feature information of the second user via the optical sensor.

Step 208, if the difference between the third heart rate feature information and a fourth heart rate feature information in the feature library is less than the threshold, the remote control compares the priority of the second user and that of the first user.

Step 209, if the priority of the second user is higher than that of the first user, the remote control sends a second playing instruction to the TV, where the second playing instruction carries an identifier of the second user, so that to the TV plays a program in a program list corresponding to the identifier of the second user.

Figure 3:
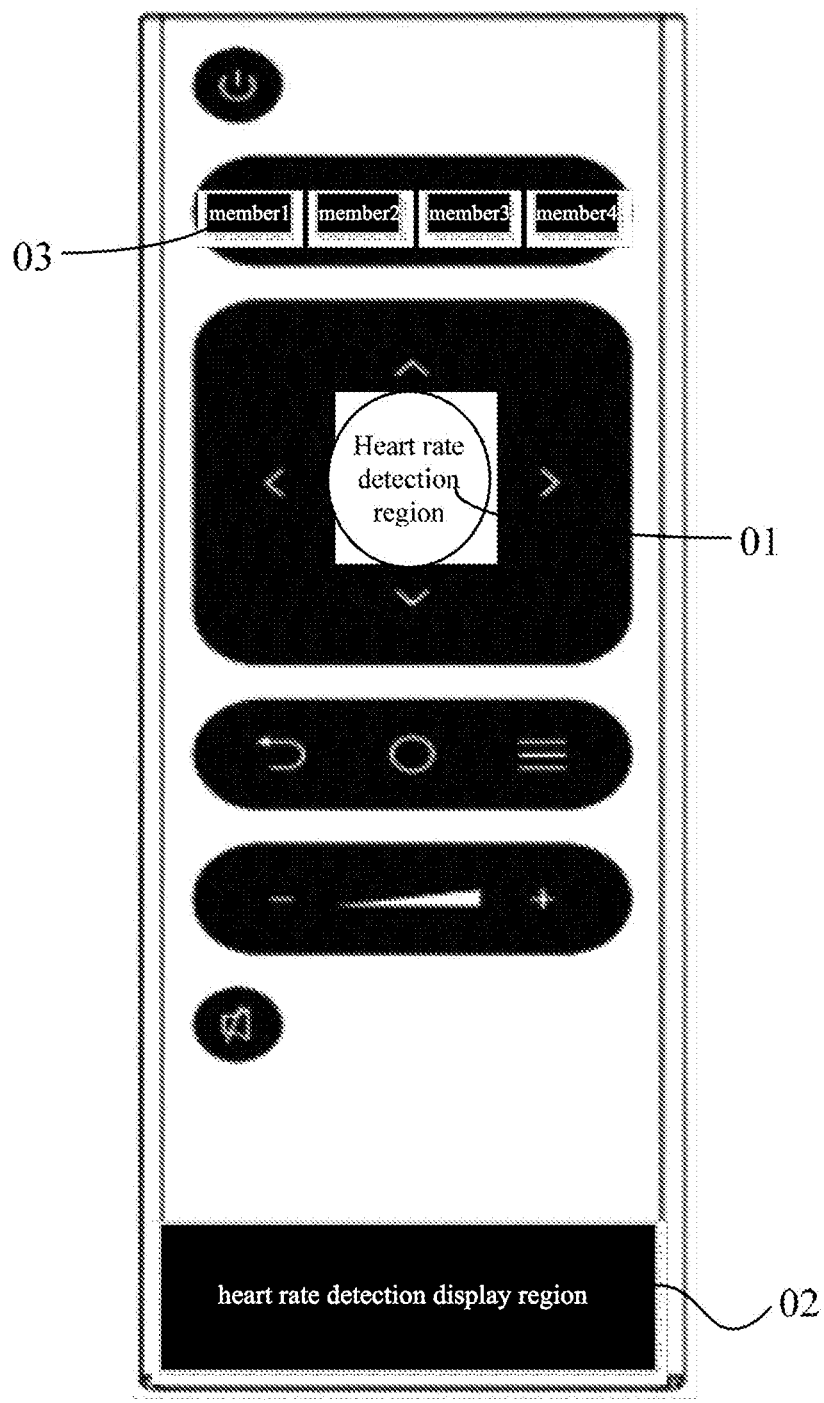
FIG. 3 is a schematic view showing an interface of the remote control according to one embodiment of the present disclosure.
Figure 4:
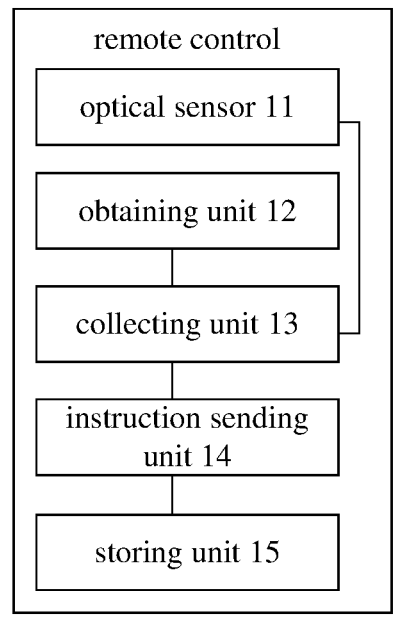
FIG. 4 is a schematic view showing a structure of the remote control according to at least one embodiment of the present disclosure.

Specifically, in Step 201, when a TV system is in standby state, the remote control detects a first unlock action triggered by the first user, and generates the first unlock instruction based on the first unlock action. For example, FIG. 3 shows an interface of the remote control according to one embodiment of the present disclosure. The remote control detects the first unlock instruction generated when the first user put his thumb on a heart rate detection region 01 provided with the optical sensor, the first unlock instruction indicates to obtain the first heart rate feature information of the first user.

In Step 202, the remote control obtains a first heart rate feature information of the first user via the optical sensor embedded in the remote control according to the first unlock instruction. For example, an average number of heart rate measure during a certain time period is obtained, or a heart rate chart during a certain time period is obtained.

The method that the optical sensor obtains the first heart rate feature information of the first user is described in Step 102, which will not be illustrated herein.

As shown in FIG. 3, the remote control may output the first heart rate feature information obtained in Step 202 and display the same on the heart rate detection display region 02, so that the first user know his current hear rate feature.

In Step 204, the remote control compares the first heart rate feature information obtained in Step 202 and each of feature information in the feature library (referring to Table 1). If the difference between the first heart rate feature information and the second heart rate feature information in the feature library is less than the threshold, as shown in FIG. 3, the remote control lightens an indicator light of a first key 03 corresponding to the first user so as to indicate that the remote control has recognized that the first unlock action is implemented by the first user. For illustrate, the indicator light of the first key 03 is arranged in the first key.

In Step 205, after the remote control lightens the indicator light of a first key 03 corresponding to the first user, if the first user triggers the first key, the remote control sends the first playing instruction to the TV which carries the identifier of the first user.

In Step 206, the remote control searches pre-stored program list corresponding to the identifier of the first user in the program list based on the identifier of the first user in the first playing instruction sent by the remote control, so that the TV calls out a program list corresponding to the identifier of the first user and play TV programs in the program list, or play TV programs selected by the first user in the program list.

The corresponding relationship between the program lists and the identifiers of multiple users is pre-stored in the program library. The program list for each user maybe updated according to update of programs at each TV station, or each user manually updates the program list of the user.

Alternatively, if the differences between the first heart rate feature information obtained in Step 202 and each of the heart rate feature information pre-stored in the feature library are all larger than the threshold, that is the first user has no right to use the TV, at this time, the remote control needs to authenticate the first user.

If the first user is authenticated, the remote control obtains the heart rate feature information of the first user via the optical sensor, and stores the heart rate feature information of the first user and the identifier of the first user in the feature library, so as to build the corresponding relationship between the heart rate feature information of the first user and the identifier of the first user.

If the first user triggers the first unlock action and generates the first unlock instruction again later on, the remote control may find the heart rate feature information corresponding to the first user in the feature library timely based on the heart rate feature of the first user obtained by the remote control.

After the TV calls out and plays the programs in the programs list corresponding to the identifier of the first user according to the identifier of the first user in the first playing instruction, if a second unlock instruction triggered by a second user is obtained, as described in Step 207, the remote control obtains a third heart rate feature information of the second user via the optical sensor according to the second unlock instruction.

The method that the remote control obtains a third heart rate feature information of the second user via the optical sensor according to the second unlock instruction is the same as the method that the remote control obtains a first heart rate feature information of the first user via the optical sensor according to the first unlock instruction, which will not be repeated herein.

The remote control compares the third heart rate feature information obtained in Step 206 and each of feature information in the feature library (referring to Table 1). If the difference between the third heart rate feature information and the fourth heart rate feature information in the feature library is less than the threshold, the remote control further compares the priority of the second user and that of the first user.

The remote control pre-stores the priority order among all users.

If the priority of the second user is higher than that of the first user, the remote control sends a second playing instruction to the TV, where the second playing instruction carries an identifier of the second user, so that to the TV plays a program in a program list corresponding to the identifier of the second user.

Specifically, if the priority of the second user is higher than that of the first user, the remote control lightens an indicator light of a second key corresponding to the second user so as to indicate that the remote control has recognized that the second unlock action is implemented by the second user. At this time, if the second user triggers the second key, the remote control sends a second playing instruction to the TV.

Otherwise, if the priority of the first user is higher than that of the second user, the remote control still performs the first playing instruction triggered by the first user, and cannot play the program in the program list corresponding to the second user.

The method for controlling the TV by the first user and the second user is implemented during a time period from turning on the TV to turning off the TV once. That is, when the TV is turned off, the identifiers of users received by the remote control will be cleared.

The embodiments of the present disclosure provide a TV program playing method applied to a remote control which is provided with an optical sensor. When a TV system is in standby state, the remote control obtains a first unlock instruction triggered by a first user. The remote control further obtains a first heart rate feature information of the first user via the optical sensor according to the first unlock instruction. Since the feather library pre-stores corresponding relationship between identifiers of multiple users and their hear rate feature information, if the difference between the first heart rate feature information and a second heart rate feature information in a feature library is less than a threshold, matching is succeed, the remote control sends a first playing instruction to the TV, where the first playing instruction carries an identifier of the first user, so that the TV plays a program in a program list corresponding to the identifier of the first user. Therefore, the remote control may recognize the heart rate feature information of different users and provide corresponding programs to the users.

At least one embodiment of the present disclosure provides a remote control including an optical sensor 11, wherein, the remote control further includes: an obtaining unit 12, which is configured to obtain a first unlock instruction triggered by a first user when a TV system is in standby state; a collecting unit 13, which is configured to obtain a first heart rate feature information of the first user via the optical sensor according to the first unlock instruction; an instruction sending unit 14, which is configured to send a first playing instruction to the TV if the difference between the first heart rate feature information and a second heart rate feature information in a feature library is less than a threshold, where the first playing instruction carries an identifier of the first user, so that the TV plays a program in a program list corresponding to the identifier of the first user; and a storing unit 15, which is configured to store the feature library, where the feature library pre-stores corresponding relationship between identifiers of multiple users and their heart rate feature information.

Figure 5:
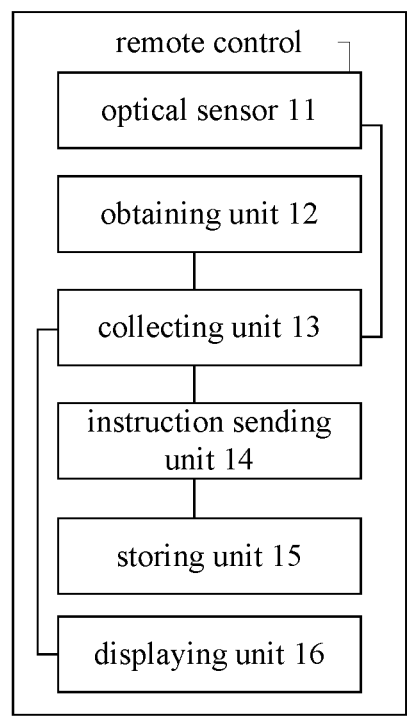
FIG. 5 is another schematic view showing a structure of the remote control according to at least one embodiment of the present disclosure.

As shown in FIG. 5, the remote control further includes a displaying unit 16, which is configured to displays the first heart rate feature information of the first user.

The displaying unit 16 is further configured to lighten an indicator light of a first key corresponding to the first user if the difference between the first heart rate feature information and the second heart rate feature information pre-stored in the feature library is less than the threshold. The instruction sending unit 14 is further configured to send the first playing instruction to the TV if the first user trigger the first key.

Figure 6:
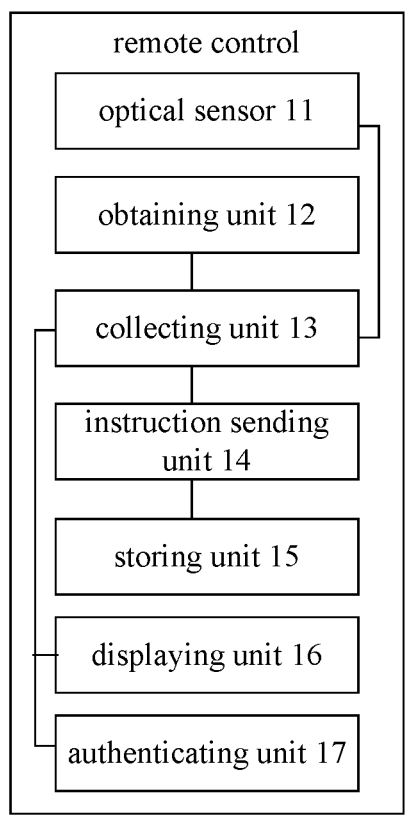
FIG. 6 is yet another schematic view showing a structure of the remote control according to at least one embodiment of the present disclosure.

As shown in FIG. 6, the remote control further includes an authenticating unit 17, which is configured to authenticate the first user if the differences between the first heart rate feature information and each of the pre-stored heart rate feature information in the feature library are all larger than the threshold. The collecting unit 13 is further configured to obtain the heart rate feature information of the first user via the optical sensor and store the heart rate feature information of the first user and the identifier of the first user in the feature library of the storing unit 15 if the first user is authenticated.

Figure 7:
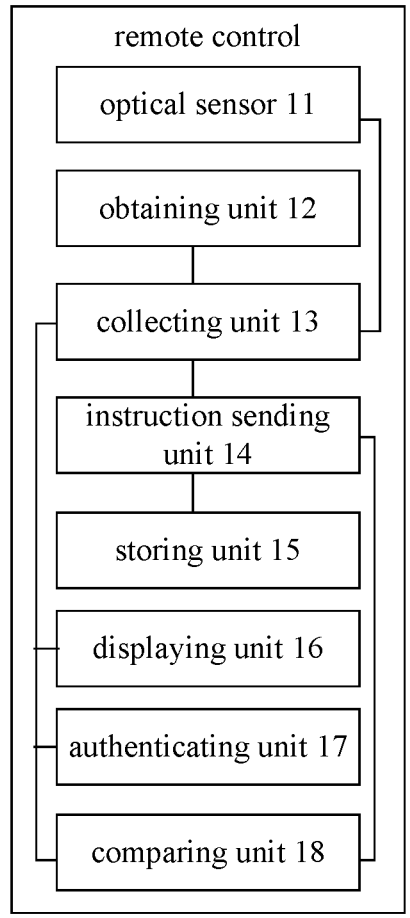
FIG. 7 is still yet another schematic view showing a structure of the remote control according to at least one embodiment of the present disclosure.

As shown in FIG. 7, the remote control further comprises a comparing unit 18. The collecting unit 13 is further configured to obtain a third heart rate feature information of a second user via the optical sensor if a second unlock instruction triggered by the second user is obtained. The comparing unit 18 is configured to compare the priority of the second user and that of the first user if the difference between the third heart rate feature information and a fourth heart rate feature information in the feature library is less than the threshold. The instruction sending unit 14 is further configured to send a second playing instruction to the TV, where the second playing instruction carries an identifier of the second user so that to have the TV plays a program in a program list corresponding to the identifier of the second user, if the priority of the second user is higher than that of the first user.

Figure 8:
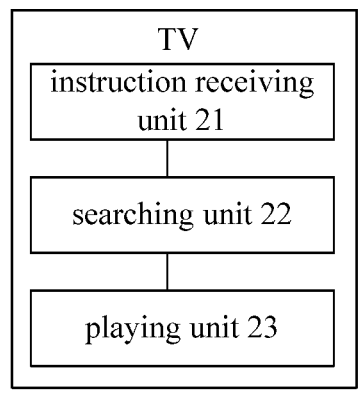
FIG. 8 is a schematic view showing a structure of a TV according to at least one embodiment of the present disclosure.

As shown in FIG. 8, one embodiment of the present disclosure provides a TV, wherein includes an instruction receiving unit 21, which is configured to receive a first playing instruction sent by a remote control, where the first playing instruction carries an identifier of a first user; an searching unit 22, which is configured to search a pre-stored program list corresponding to the identifier of the first user in a program library, where the program library pre-stores corresponding relationship between identifiers of multiple users and program lists; and a playing unit 23, which is configured to play a program in the program list corresponding to the identifier of the first user.

The embodiments of the present disclosure provide a TV program playing method applied to a remote control which is provided with an optical sensor. When a TV system is in standby state, the remote control obtains a first unlock instruction triggered by a first user. The remote control further obtains a first heart rate feature information of the first user via the optical sensor according to the first unlock instruction. Since the feather library pre-stores corresponding relationship between identifiers of multiple users and their hear rate feature information, if the difference between the first heart rate feature information and a second heart rate feature information in a feature library is less than a threshold, matching is succeed, the remote control sends a first playing instruction to the TV, where the first playing instruction carries an identifier of the first user, so that the TV plays a program in a program list corresponding to the identifier of the first user. Therefore, the remote control may recognize the heart rate feature information of different users and provide corresponding programs to the users.

In the description of the disclosure, specific features, structures, materials and features may be properly combined in any one or more embodiments The above are merely the preferred embodiments of the present disclosure. Obviously, a person skilled in the art may make further modifications and improvements without departing from the principle of the present disclosure, and these modifications and improvements shall also fall within the scope of the present disclosure.

What is claimed is:

1. A TV program playing method applied to a remote control which is provided with an optical sensor, wherein the method comprises:
   obtaining, by the remote control, a first unlock instruction triggered by a first user when a TV system is in a standby state;

obtaining, by the remote control, a first heart rate feature information of the first user according to the first unlock instruction via the optical sensor;
displaying, by the remote control, the first heart rate feature information of the first user;
when a difference between the first heart rate feature information and a second heart rate feature information in a feature library is less than a threshold:
sending, by the remote control, a first playing instruction carrying an identifier of the first user to the TV, so that the TV plays a program in a program list corresponding to the identifier of the first user, wherein the feature library pre-stores corresponding relationship between identifiers of a plurality of users and heart rate feature information of the plurality of users;
lightening, by the remote control, an indicator light of a first key corresponding to the first user; and
sending, by the remote control, the first playing instruction to the TV when the first user triggers the first key;
authenticating, by the remote control, the first user when the difference between the first heart rate feature information and each of a pre-stored heart rate feature information in the feature library are all larger than the threshold;
obtaining, by the remote control, the first heart rate feature information of the first user via the optical sensor; and
storing the first heart rate feature information of the first user and the identifier of the first user in the feature library when the first user is authenticated.

2. The method according to claim 1, wherein after the remote control sends the first playing instruction to the TV when the difference between the first heart rate feature information and the second heart rate feature information in the feature library is less than the threshold, the method further comprises:
obtaining, by the remote control, a third heart rate feature information of a second user via the optical sensor when a second unlock instruction triggered by a second user is obtained;
comparing, by the remote control, a priority of the second user and a priority of the first user when the difference between the third heart rate feature information and a fourth heart rate feature information in the feature library is less than the threshold; and
sending, by the remote control, a second playing instruction carrying an identifier of the second user to the TV when the priority of the second user is higher than the priority of the first user, so that the TV plays the program in a program list corresponding to the identifier of the second user.

3. The method according to claim 1, wherein the first heart rate feature information of the first user is an average value of the heart rate of the first user measured in a certain time period or a heart rate chart of the first user in a certain time period.

4. The method according to claim 2, wherein the remote control pre-stores a priority order among all users.

5. The method according to claim 1, wherein after the remote controller obtains the first heart rate feature information of the first user via the optical sensor according to the first unlock instruction, the method further comprises:
authenticating, by the remote control, the first user when the differences between the first heart rate feature information and each of the pre-stored heart rate feature information in the feature library are all larger than the threshold; and
obtaining, by the remote control, the heart rate feature information of the first user via the optical sensor, and storing the heart rate feature information of the first user and the identifier of the first user in the feature library when the first user is authenticated.

6. The method according to claim 1, wherein after the remote controller sends the first playing instruction to the TV when the difference between the first heart rate feature information and the second heart rate feature information in the feature library is less than the threshold, the method further comprises:
obtaining, by the remote control, a third heart rate feature information of a second user via the optical sensor when a second unlock instruction triggered by a second user is obtained;
comparing, by the remote control, a priority of the second user and a priority of the first user when the difference between the third heart rate feature information and a fourth heart rate feature information in the feature library is less than the threshold; and
sending, by the remote control, a second playing instruction carrying an identifier of the second user to the TV if the priority of the second user is higher than the priority of the first user, so that the TV plays the program in a program list corresponding to the identifier of the second user.

7. The method according to claim 1, wherein after the remote control obtains the first heart rate feature information of the first user via the optical sensor according to the first unlock instruction, the method further comprises:
authenticating, by the remote control, the first user when the differences between the first heart rate feature information and each of the pre-stored heart rate feature information in the feature library are all larger than the threshold; and
obtaining, by the remote control, the heart rate feature information of the first user via the optical sensor, and storing the heart rate feature information of the first user and the identifier of the first user in the feature library when the first user is authenticated.

8. The method according to claim 1, wherein after the remote control sends the first playing instruction to the TV when the difference between the first heart rate feature information and the second heart rate feature information in the feature library is less than the threshold, the method further comprises:
obtaining, by the remote control, a third heart rate feature information of a second user via the optical sensor when a second unlock instruction triggered by a second user is obtained;
comparing, by the remote control, a priority of the second user and that of the first user when the difference between the third heart rate feature information and a fourth heart rate feature information in the feature library is less than the threshold; and
sending, by the remote control, a second playing instruction carrying an identifier of the second user to the TV when the priority of the second user is higher than that of the first user, so that the TV plays a program in a program list corresponding to the identifier of the second user.

9. A remote control, comprising an optical sensor, wherein the remote control is configure to:
obtain a first unlock instruction triggered by a first user when a TV system is in standby state;

obtain a first heart rate feature information of the first user via the optical sensor according to the first unlock instruction;

send a first playing instruction carrying an identifier of the first user to the TV when a difference between the first heart rate feature information and a second heart rate feature information in a feature library is less than a threshold, so that the TV plays a program in a program list corresponding to the identifier of the first user; and send the first playing instruction to the TV when the first user triggers a first key;

a storing unit configured to store the feature library, the feature library pre-storing corresponding relationship between identifiers of a plurality of users and heart rate feature information of the plurality of users display the first heart rate feature information of the first user; and lighten an indicator light of the first key corresponding to the first user when the difference between the first heart rate feature information and the second heart rate feature information pre-stored in the feature library is less than the threshold; and authenticate the first user when the difference between the first heart rate feature information and each of the pre-stored heart rate feature information in the feature library are all larger than the threshold, and store the heart rate feature information of the first user and the identifier of the first user in the feature library when the first user is authenticated.

10. The remote controller according to claim 9, wherein the remote controller is further configure to:

obtain a third heart rate feature information of a second user via the optical sensor when a second unlock instruction triggered by the second user is obtained;

compare a priority of the second user and a priority of the first user when the difference between the third heart rate feature information and a fourth heart rate feature information in the feature library is less than the threshold; and send a second playing instruction carrying an identifier of the second user to the TV when the priority of the second user is higher than the priority of the first user, so that the TV plays the program in a program list corresponding to the identifier of the second user.

11. The remote controller according to claim 9, wherein the remote control further comprises:

authenticate the first user when the difference between the first heart rate feature information and each of the pre-stored heart rate feature information in the feature library are all larger than the threshold, obtain the heart rate feature information of the first user via the optical sensor and store the heart rate feature information of the first user and the identifier of the first user in the feature library when the first user is authenticated.

12. The remote controller according to claim 9, wherein the remote controller further comprises a comparing unit, wherein:

obtain a third heart rate feature information of a second user via the optical sensor when a second unlock instruction triggered by the second user is obtained;

compare a priority of the second user and that of the first user when the difference between the third heart rate feature information and a fourth heart rate feature information in the feature library is less than the threshold; and send a second playing instruction carrying an identifier of the second user to the TV, when the priority of the second user is higher than that of the first user, so that the TV plays the program in the program list corresponding to the identifier of the second user.

* * * * *